US007505850B2

(12) United States Patent
Kim et al.

(10) Patent No.: US 7,505,850 B2
(45) Date of Patent: Mar. 17, 2009

(54) APPARATUS AND METHOD FOR PREVENTING COLLISION OF VEHICLE AT CROSSROADS

(75) Inventors: Min-Soo Kim, Daejon (KR); Eunkyu Lee, Daejon (KR); Mi-Jeong Kim, Daejon (KR); Inhak Joo, Daejon (KR); Byung-Tae Jang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 516 days.

(21) Appl. No.: 11/238,744

(22) Filed: Sep. 29, 2005

(65) Prior Publication Data

US 2006/0116821 A1 Jun. 1, 2006

(30) Foreign Application Priority Data

Nov. 29, 2004 (KR) ...................... 10-2004-0098789

(51) Int. Cl.
*G06F 17/10* (2006.01)

(52) U.S. Cl. ....................................... 701/301; 342/455

(58) Field of Classification Search ......... 701/300–302, 701/200, 117–119; 340/901–905, 933, 988, 340/435–436; 342/455
See application file for complete search history.

(56) References Cited

U.S. PATENT DOCUMENTS

| | | | | |
|---|---|---|---|---|
| 6,326,903 | B1 * | 12/2001 | Gross et al. | 340/988 |
| 6,662,141 | B2 | 12/2003 | Kaub | |
| 6,741,168 | B2 | 5/2004 | Webb et al. | |
| 6,958,707 | B1 * | 10/2005 | Siegel | 340/902 |
| 6,985,090 | B2 * | 1/2006 | Ebner et al. | 340/907 |

FOREIGN PATENT DOCUMENTS

| | | |
|---|---|---|
| KR | 1998 052874 | 9/1998 |
| KR | 2002 0015135 | 2/2002 |
| KR | 2003 0051171 | 6/2003 |
| KR | 10-2004 0040771 | 5/2004 |
| KR | 10-2004 0053986 | 6/2004 |

* cited by examiner

*Primary Examiner*—Yonel Beaulieu
(74) *Attorney, Agent, or Firm*—Ladas & Parry LLP

(57) ABSTRACT

An apparatus and method of preventing a collision of vehicle in a crossroad are disclosed. The apparatus includes: an information generating unit installed at each of roads near the crossroad for generating real-time vehicle information by integrating vehicle's information including a speed and a position provided from the vehicles on each of the roads and traffic sign information; and an information collecting and providing unit for providing the traffic sign information to the information generating unit, collecting vehicles' information in real-time from the information providing means of a predetermined road near the crossroad, storing the collected information, and providing the collected information to vehicles approaching the crossroad through another roads for the vehicles to predict a collision in the crossroad.

13 Claims, 4 Drawing Sheets

APPARATUS AND METHOD FOR PREVENTING COLLISION OF VEHICLE AT CROSSROADS

FIELD OF THE INVENTION

The present invention relates to an apparatus and method for preventing a collision of vehicle at a sensor network based crossroad; and, more particularly, to an apparatus and method for preventing a collision of vehicle at a sensor network based crossroad by installing a plurality of smart sensor nodes around a crossroad, building a communication network between the smart sensor nodes, obtaining real-time information of vehicles approaching the crossroad, transmitting the obtained real-time information to vehicles approaching the crossroad, and analyzing the transmitted information at each of the vehicles approaching the crossroad for preventing a collision.

DESCRIPTION OF THE PRIOR ART

A ubiquitous computing technology and a telematics technology are merged into the present invention. That is, the ubiquitous computing technology is used to collect real-time information of vehicles such as speeds and positions of vehicles approaching a crossroad, and the telematics technology is used to analyze the collected real-time information to prevent a collision of vehicles at the crossroad.

Herein, a smart sensor node includes a sensing unit for collecting information, a storing unit for storing information, a computing unit for processing information, a communication unit for transmitting information, and a power unit for supplying electric power.

The sensor node is recently spotlighted as a core technique of the ubiquitous computing technology, and the sensor node is fundamentally distinguished from a conventional RFID. The conventional RFID is easily installed at peripheral objects. However, the conventional RFID provides only prestored Identify information and has comparatively inferior abilities of computing, storing and communicating. Furthermore, a communication network cannot be formed of RFIDs.

On the contrary, the smart sensor node is capable of generating new information by sensing objects and has superior abilities of computing, storing, and communicating. Especially, a communication network is formed of the sensor nodes in order to improve a quality of information. An information processing technique using a sensor network is a recently developed technology and takes a growing interest in a network field, a hardware field, and a database field.

A sensor based telematics application has not been introduced utile now. Especially, there is no method disclosed for preventing a collision of vehicles at a crossroad using a sensor network.

However, it expects that ubiquitous computing technology will be actively developed and used in near future. Accordingly, sensor nodes may be installed at all of objects around us in near future. It also expects that such a ubiquitous computing technology will be applied to a telematics field related to safety of vehicle such as collision of vehicles.

A first conventional technology for preventing a collision of vehicles is introduced in Korea Patent Publication No. 2003-0051171, entitled "APPARATUS AND METHOD FOR AUTOMATED TRANSFER OF COLLISION INFORMATION." The first conventional technology collects information related to collision of objectives after vehicles are crashed and transmits the collected information. Therefore, the first conventional technology is distinguished from the present invention that prevents a collision of vehicles by collecting information of vehicles approaching a crossroad and predicting a collision of vehicles based on the collected information.

That is, the first conventional technology is used to elucidate a reason of collision based on information collected after the vehicles are crashed. However, the present invention not only predicts a collision of the vehicles to prevent actual collision of vehicles, but also elucidates reasons of collision when the vehicles are actually clashed.

A second conventional technology is introduced in Korean Publication No. 2004-0053986, entitled "LANE DEVIATION WARNING SYSTEM." The second conventional technology prevents collision of vehicles by preventing deviation of traffic lane using an optical sensor mounted at a vehicle. However, the present invention prevents a collision of vehicles through wireless communication between sensor nodes installed at around roads and vehicles for sensing a speed and a position of vehicles approaching a crossroad.

That is, the present invention is different from the second conventional technology. The second conventional technology prevents collision of vehicles caused by deviation of traffic lane. On the contrary, the present invention prevents a collision of vehicles in a crossroad by using information of vehicles approaching the crossroad such as a speed, a position, a direction and a current traffic sign. Also, the present invention can find reasons of collision when the vehicles are actually clashed at the crossroad.

A third conventional technology is introduced in a Korea Patent Publication No. 2004-0040771, entitled "DEVICE FOR PREVENTING A COLLISION BETWEEN VEHICLES." The third conventional technology prevents a collision of vehicles by detecting a distance between vehicles using a distance sensor installed at each vehicle. Therefore, the third conventional technology also different from the present invention that prevents a collision of vehicles using wireless communication between sensing nodes installed at roads and vehicles for sensing speeds, positions, directions of vehicles approaching a crossroad.

As described above, the third conventional technology prevents a collision of vehicles using a repulsive force generated by a magnetic field between vehicles after predicting a collision. However, the present invention prevents a collision by providing a warning message with predicted collision information to a driver of vehicle after predicting the collision. The present invention also finds reasons of the collision after vehicles are actually crashed.

Although various conventional technologies have been introduced for predicting and preventing the collision of vehicles as described above, these conventional technologies do not use the sensor nodes installed at roads and vehicles. These conventional technologies use sensing devices such as a laser device installed at the vehicles to calculate a distance. Therefore, inaccurate information is provided by the conventional technologies and a communication network is not formed between the sensing devices because of the inferior sensing devices.

SUMMARY OF THE INVENTION

It is, therefore, an object of the present invention to provide an apparatus and method for preventing a collision of vehicle at a sensor network based crossroad by installing a plurality of smart sensor nodes around a crossroad, building a communication network between the smart sensor nodes, obtaining real-time information of vehicles passing the crossroad, broadcasting the obtained real-time information to vehicles approaching the crossroad, and analyzing the broadcasted information at each of the vehicles approaching the crossroad for preventing a collision.

In accordance with one aspect of the present invention, there is provided an apparatus for preventing a collision of vehicles at a crossroad in a network environment configured with a plurality of sensor nodes installed on roads connected to the crossroad, the apparatus including: an information generating unit installed at each of roads near the crossroad for generating real-time vehicle information by integrating vehicle's information including a speed and a position provided from the vehicles on each of the roads and traffic sign information; and an information collecting and providing unit for providing the traffic sign information to the information generating unit, collecting vehicles' information in real-time from the information providing unit of a predetermined road near the crossroad, storing the collected information, and providing the collected information to vehicles approaching the crossroad through another roads for the vehicles to predict a collision in the crossroad.

The apparatus may further include: an information providing unit installed at a vehicle for providing vehicle's information including a speed and a position of the vehicle running on roads where the sensor nodes are connected through a network to the information generating unit; and an information analyzing unit installed at a vehicle for analyzing the real-time vehicle information including a speed, a position and a current traffic sign transmitted from the information collecting and providing unit and predicting a collision of vehicles approaching the crossroad based on the result of analysis.

In accordance with another aspect of the present invention, there is provided a method of preventing a collision of vehicles at a crossroad, wherein the method including the steps of: a) installing sensor nodes on each of roads and building a network environment between the sensor nodes; b) collecting traffic sign information of the crossroad in real time by the sensor node of a predetermined road, sensing a speed and a position of vehicle on a corresponding road, and generating real-time vehicle information; c) providing traffic sign information of the crossroad from the sensor node to the vehicle, and predicting a traffic sign when the vehicle arrives at the crossroad by the vehicle; and d) collecting a message protocol type of real-time vehicle information at a base station, and providing the collected information to vehicles approaching the crossroad through other roads to predict a collision in the crossroad.

The method may further includes the step of predicting a traffic sign when the vehicle arrives at the crossroad based on the speed and the position of the vehicle and the traffic sign information from the sensor node, and providing a warning message using the predicted traffic sign information.

The method may further including the steps of: predicting whether the own vehicle is clashed to other vehicle within a danger area of the crossroad at each of vehicles which receive the message protocol information; and providing a warning message of collision before entering the crossroad when the collision is predicted.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 1:
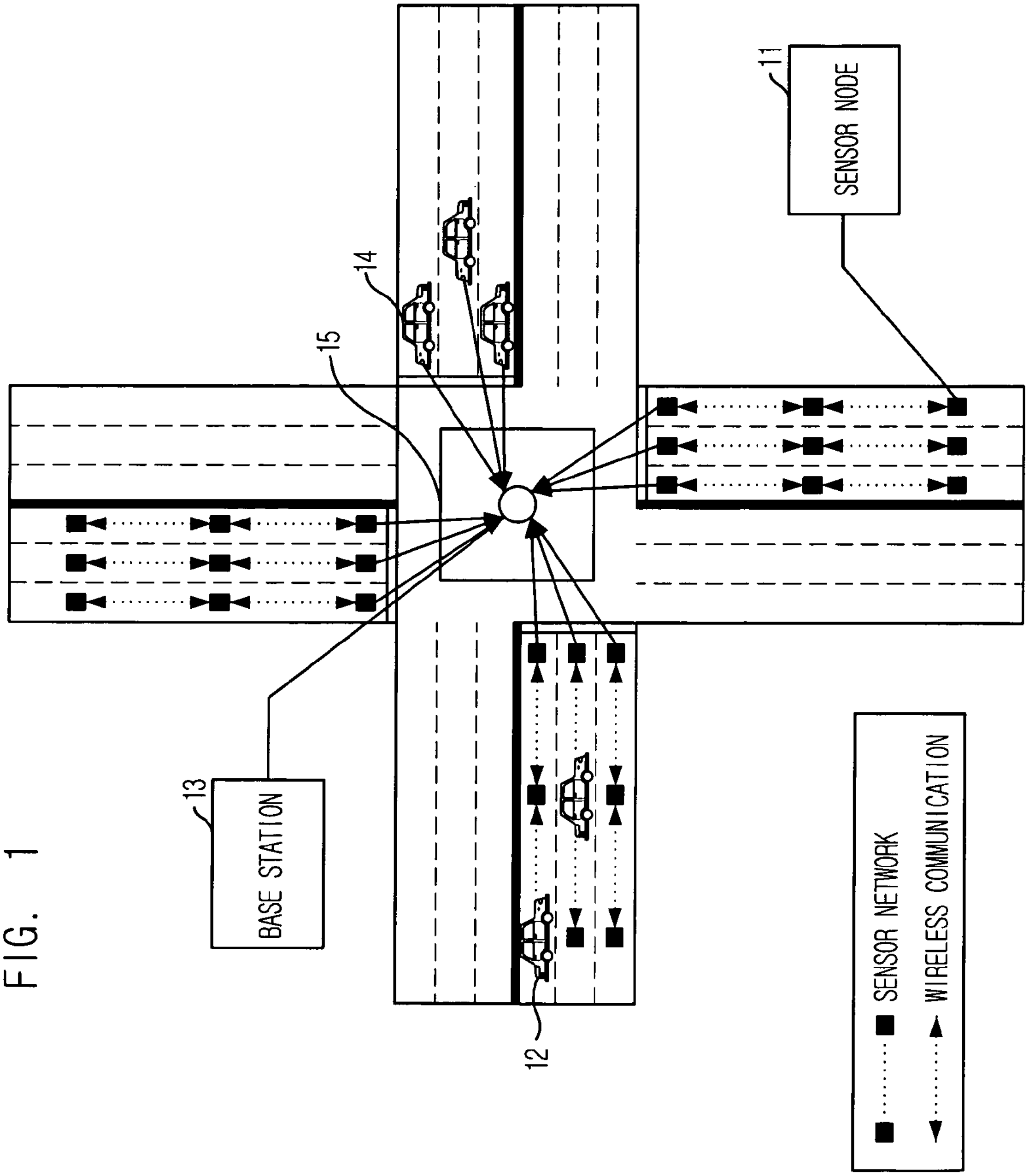
FIG. 1 shows a system of preventing a collision of vehicles at a sensor network based crossroad in accordance with a preferred embodiment of the present invention.

FIG. 1 shows a system for preventing a collision of vehicles at a sensor network based crossroad in accordance with a preferred embodiment of the present invention.

Referring to FIG. 1, the system for preventing a collision of vehicles at a sensor network based crossroad includes a plurality of sensor nodes 11, a plurality of vehicles 12, 14, and a base station 13.

Figure 2:
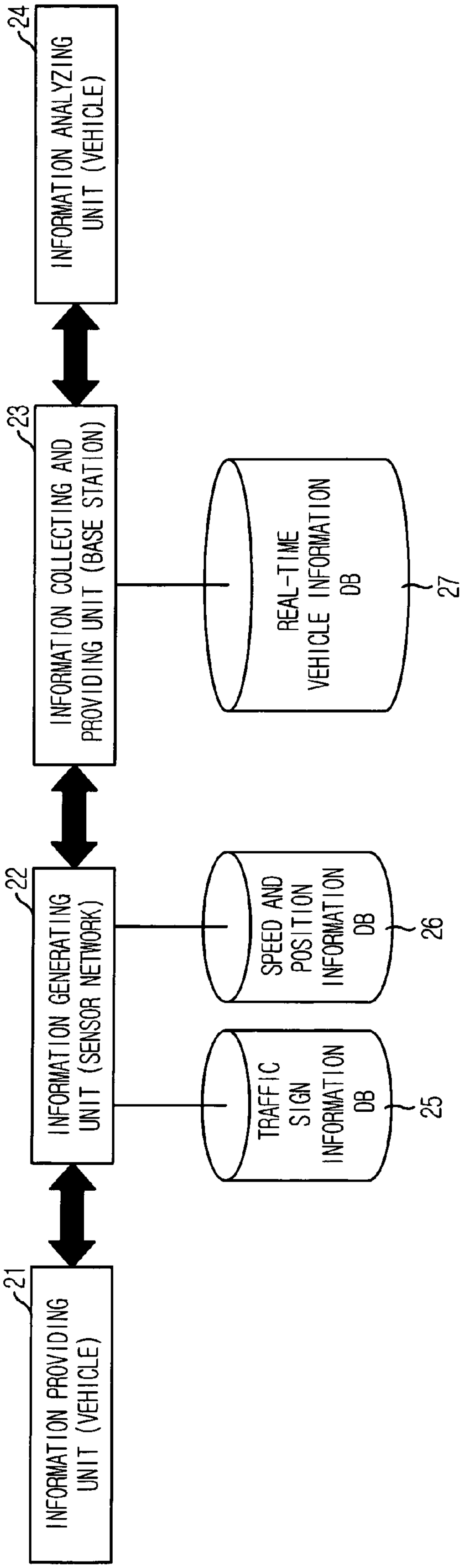
FIG. 2 is a block diagram illustrating an apparatus for preventing a collision of vehicles at a sensor network based crossroad in accordance with a preferred embodiment of the present invention.

The sensor nodes 11 are installed at roads near a crossroad. The sensor nodes 11 sense a speed and a position of vehicle 12 and collect traffic sign information from the base station 13. The vehicle 12 runs on the roads where a sensor network is formed of a plurality of sensor nodes 11, and provides real-time information such as a speed and a position. The sensor network is shown in FIG. 2 as an information generating unit 22 in FIG. 2, and the vehicle 12 is also shown in FIG. 2 as an information providing unit 21. The base station 13 collects the real-time information transmitted from the sensor nodes 11 installed at each road of a crossroad, and provides the collected real-time information to vehicles 14 approaching the crossroad from another direction. The base station 13 is shown in FIG. 2 as an information collecting and providing unit 23. The vehicles 14 analyze the real-time information transmitted from the base station 13 to predict a possibility of collision in a danger area 15 in the crossroad. The vehicles 14 are shown in FIG. 2 as an information analyzing unit 24. The danger area 15 is a predetermined region of the crossroad where vehicles are often clashed.

Herein, any of vehicles shown in FIG. 1 may be one of the vehicle 12 providing real-time information and the vehicle 14 receiving the real-time information. That is, any of vehicles approaching the crossroad can be both of the vehicle 12 providing real-time information and the vehicle 14 receiving the real-time information at the same time.

The system according to the present embodiment collects information of vehicles 12 approaching the crossroad such as speeds and positions in real time and provides the collected information to vehicles 14 approaching the crossroad from another direction compared to the vehicles 12. The vehicles 14 analyze the provided real time information to detect a possibility of collision in the crossroad and prevent the collision in the crossroad.

FIG. 2 is a block diagram illustrating an apparatus for preventing a collision of vehicles at a sensor network based crossroad in accordance with a preferred embodiment of the present invention.

Referring to FIG. 2, the apparatus for preventing a collision of vehicles according to the present embodiment includes an information generating unit 22 and an information collecting and providing unit 23. The information generating unit 22 is installed at roads near the crossroad and generates real-time vehicle information by integrating vehicle's information such as speeds and positions provided from each of vehicles and traffic sign information transmitted from the information collecting and providing unit 23 when a plurality of sensor nodes is installed in the roads near the crossroad and a communication network is formed between the sensor nodes. The information collecting and providing unit 23 provides traffic sign information to the information generating unit 22 in real time, collects the real-time vehicle information from the information generating unit 22 installed at a predetermined road near the crossroad, stores the collected real-time vehicle information and provides the stored real-time vehicle information to vehicles approaching the crossroad through other roads to predict a possibility of collision in the crossroad. The apparatus for preventing the collision of vehicles according to the present embodiment further includes an information providing unit 21 and an information analyzing unit 24. The information providing unit 21 is installed at a vehicle and provides a speed and a position of the vehicle to the information generating unit 22 in real time when the vehicle is running on the roads where a sensor network is formed. The information analyzing unit 24 is also installed at a vehicle. The information analyzing unit 24 predicts a collision in a danger area of a crossroad by analyzing real-time vehicle information such as a speed, a position and a current traffic sign transmitted from the information collecting and providing unit 23.

Herein, the information generating unit 22 stores speeds and positions obtained from vehicles approaching the crossroad in a speed and position information DB 26, and stores traffic sign information provided from the collecting and providing unit 23 in a traffic sign information DB 25.

The information providing unit 21 may be a vehicle approaching a crossroad through connected roads where a plurality of sensor nodes forms a network. That is, the information providing unit 21 includes a mobile sensor node installed at the vehicle. The mobile sensor node is capable of communicating with a plurality of sensor nodes installed at roads through a wireless link and capable of performing an information analysis algorithm.

The information providing unit 21 may predict a traffic sign when the own vehicle arrives at the crossroad using information provided from the information generating unit 22 such as traffic sign information and speed and position information. Accordingly, the information providing unit 21 may provide a warn message to reduce a speed before entering the crossroad when the predicted traffic sign is 'stop'.

The information providing unit 21 and the information analyzing unit 24 may be an identical mobile sensor node installed at a vehicle.

The information generating unit 22 is a sensor network formed of a plurality of sensor nodes installed on roads near the crossroad. The information generating unit 22 collects real-time vehicle information by sensing a speed and a position of vehicles running through the sensor network and collects real-time traffic sign information from the traffic sign information DB 25. After collecting the information, the information generating unit 22 generates real-time vehicle information shown in FIG. 3. The generated real-time vehicle information is transmitted to the collecting and providing unit 23 through the sensor network.

Herein, each sensor node included in the information generating unit 22 previously has accurate comparative position information based on the collecting and providing unit 23 (base station) for obtaining exact position information of vehicles. The comparative position information is used to sense a position of vehicle.

The information generating unit 22 is installed on all of roads near the crossroad as shown in FIG. 1.

The information collecting and providing unit 23 is a base station installed at a center of the crossroad. Generally, the collecting and providing unit 23 is installed with a traffic sign, physically.

The information collecting and providing unit 23 must have a superior computing ability since the collecting and providing unit 23 must quickly collect mass amount of information from the roads near the crossroad and transmit the collected information to each of vehicles in real-time.

Figure 3:
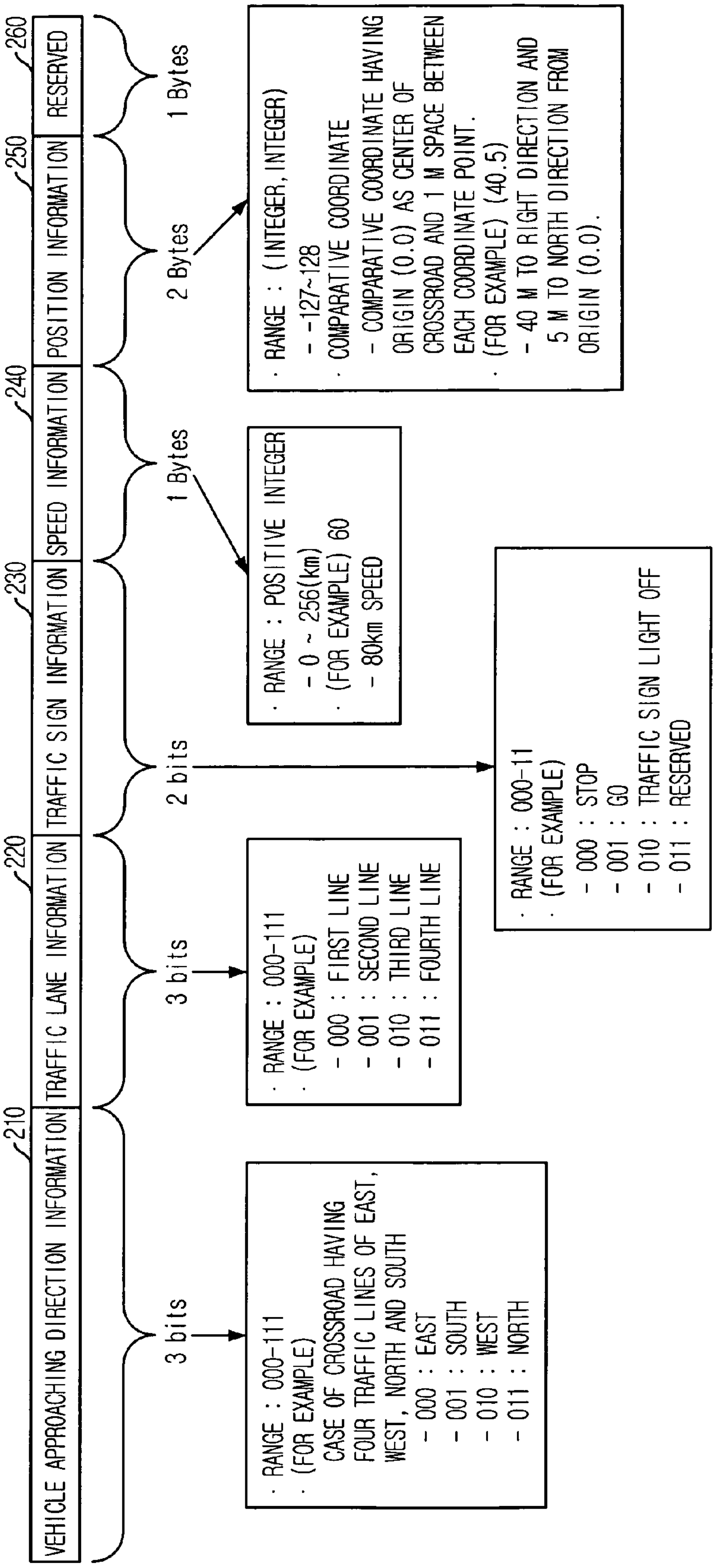
FIG. 3 is a block diagram showing a structure of a message protocol for preventing a collision of vehicles in accordance with a preferred embodiment of the present invention.

The information collecting and providing unit 23 transmits a message protocol having a structure shown in FIG. 3 to the information analyzing unit 24.

The information collecting and providing unit 23 stores real-time vehicle information collected from all roads near the crossroad in the real-time vehicle information DB 27 in a manner of queue according to a time slot. For example, if the crossroad is connected to four roads, 16 information are stored according to each time slot.

The information analyzing unit 24 is a mobile sensor node installed at a vehicle, which is similar to the information providing unit 21. That is, the sensor node installed at the vehicle has a superior computing and communicating ability compared to sensor nodes installed on the roads. It is because the information analyzing unit 24 must quickly and effectively analyze a mass amount of information collected from the information collecting and providing unit 23 to predict a possibility of collision in the crossroad.

If the collision is predicted in the crossroad based on the position and speed information shown in FIG. 3, the information analyzing unit 24 provides a warning message to a driver of vehicle 1 or 2 seconds before the vehicle enters the crossroad.

FIG. 3 is a block diagram showing a structure of a message protocol for preventing a collision of vehicles in accordance with a preferred embodiment of the present invention. The message shown in FIG. 3 is generated in the information generating unit 22 and transmitted to the information collecting and providing unit 23 and the information analyzing unit 24.

As shown in FIG. 3, the real-time vehicle information provided from the collecting and providing unit 23 to the information analyzing unit 24 is basically configured with vehicle approaching direction information 210, traffic lane information 220, traffic sign information 230, speed information 240 and position information 250. Other supplementary information may be included in the real-time vehicle information. In order to reduce a consumption of energy in a sensor network and to quickly transfer information, a quantity of the message protocol must be minimized. The message protocol shown in FIG. 3 is configured with 5 bytes including one byte of reserved information.

The vehicle approaching direction information 210 denotes a direction of vehicle approaching the crossroad through roads connected to the crossroad. That is, the vehicle approaching direction represents one of roads connected to the crossroad which is passed through a corresponding vehicle. Generally, three bits are allocated to represent each of roads as a direction identification. For example, if the crossroad includes roads from east, west, north and south, the direction identification 000 is allocated to the road from east, the direction identification 001 is allocated to the road from south, the direction identification 010 is allocated to the road from north, and the direction identification 011 is allocated to the road from north. Since three bits are allocated to the direction identification, direction identifications can represent maximum 8 roads connected to the crossroad.

The traffic lane information 220 is also configured with three bits. Accordingly, identification can be allocated to maximum 8 traffic lanes. For example, an identification 000 is allocated to a first traffic lane, and an identification 111is allocated to an eighth traffic lane.

The traffic sign information 230 is configured with two bits. "00" denotes a red light meaning "stop," "0l" denotes a green light meaning "go", and "10" denotes a predetermined sign of the traffic sign when the traffic sign is turned off or blanking. "11" denotes a traffic "reserved" sign.

The speed information 240 is configured with one byte representing a positive integer. That is, the speed information 240 can denotes speeds from 0 to 256 km per hour or mile per hour.

The position information 250 is configured with one byte of an integer pair. Each integer value can represent −127 to 128. Especially, the position information 25 denotes a comparative coordinate having 1 m interval between adjacent coordinate and having an origin (0,0). For example, (40,5) denotes a position 40 m apart from the origin (0.0) to right direction and 5 m apart from the origin (0.0) to an upper direction. In order to reduce a quantity of a message protocol, the comparative coordinate is used instead of using an absolute coordinate. Also, the information analyzing unit 24 may effectively and quickly perform a predetermined algorithm to analyze collected information.

Figure 4:
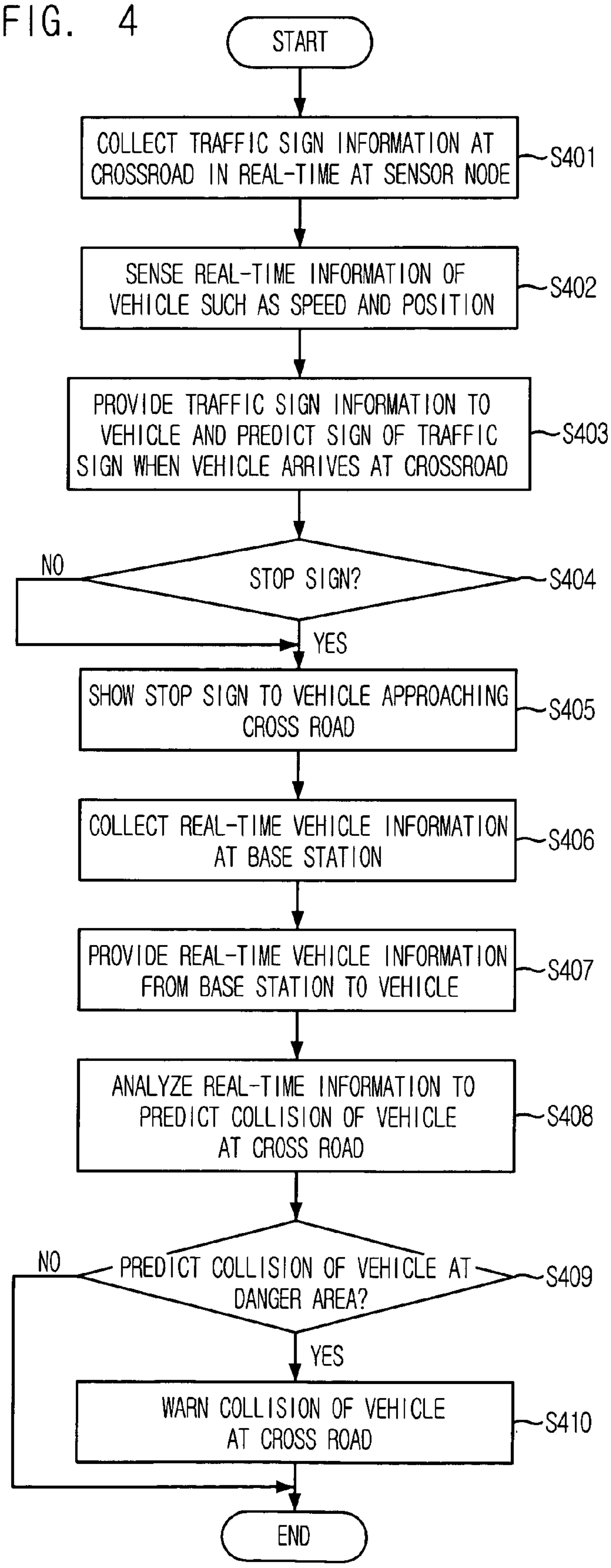
FIG. 4 is a flowchart of a method for preventing a collision of vehicles at a sensor network based crossroad in accordance with a preferred embodiment of the present invention.

FIG. 4 is a flowchart of a method for preventing a collision of vehicles at a sensor network based crossroad in accordance with a preferred embodiment of the present invention.

At first, the information generating unit 22 collects traffic sign information provided from the information collecting and providing unit 23 at step S401, and senses vehicle's information such as a speed and a position from the information providing unit 21 to generating real-time vehicle information at step S402.

The information generating unit 22 provides the traffic sign information of the crossroad to the information providing unit 21, and the information providing unit 21 predicts a future traffic sign when the corresponding vehicle is arrived at the crossroad by using the speed and position information and the provided traffic sign information at step S403.

The information providing unit 21 determines whether the predicted traffic sign is "go" or "stop" at step S404. If the predicted traffic sign is "stop", a warning message is provided to a driver to reduce a speed of a vehicle when the vehicle approaches the crossroad at step S405. After then, the information collecting and providing unit 23 (base station) collects all of messages transmitted from the information generating units 22 on each of traffic lanes at step S406.

If the predicted traffic sign is "go", the step S406 is performed, instantly.

The information collecting and providing unit 23 analyzes the collected message information and transmits the analysis result to each of the information analyzing units 24 at step S407.

When the message information is analyzed and transmitted to the each of the information analyzing units 24 in real time, information collected from an own traffic lane is not transmitted vehicles located in the own traffic lane. That is, the vehicle approaching direction information 210 is used for not transmitting information collected from the own traffic lane to vehicles located in the own traffic lane.

After then, the information analyzing unit 24 analyzes the transmitted a message protocol to predict a possibility of collision in the crossroad at step S408. An algorithm of predicting a collision predicts future positions of vehicles according to a time slot using own vehicle's information such as a position and a speed, and other vehicles' information. If more than one of vehicles has same position information in same time slot, the algorithm determines that vehicles will be clashed at the crossroad. If it predicts that more than one of vehicles in a danger area 50 at the same time, it predicts that these vehicles will be clashed. The danger area 50 is a rectangular shape of a predetermined region in the crossroad. If the size of the danger area 50 is large, the possibility of the collision may be dropped, and if the size of the danger area 50 is small, the possibility of the collision may be increased.

Finally, the information analyzing unit 24 inspects whether another vehicle is in the danger area 50 at step S409. If another vehicle is in the danger area 50, a warning message is provided to the own vehicle at step S410. If only own vehicle is in the danger area, the method is instantly terminated.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, a future position of vehicle according to a time slot is predicted by the present invention by collecting speeds and positions of vehicles approaching the crossroad using a sensor network and analyzing the collected information. Therefore, a collision of vehicles in a crossroad is accurately predicted in the present invention.

The number of traffic accidents in the crossroad is dramatically reduced by previously providing warning information of crossroad to a driver of each vehicle approaching the crossroad. That is, the present invention supports to safe drive in a crossroad by predicting sudden situation caused when a driver may break a traffic sign or a driver may be unable to see obstacles in a crossroad.

Exact position and speed of vehicle can be quickly obtained by using a sensor network which is one of representative techniques of a ubiquitous computing technology.

Also, the present invention can be used for finding reasons of collision when vehicles are actually clashed at the crossroad.

The present application contains subject matter related to Korean patent application No. 2004-0098789, filed in the Korean Intellectual Property Office on Nov. 29, 2004, the entire contents of which is incorporated herein by reference.

While the present invention has been described with respect to the particular embodiments, it will be apparent to those skilled in the art that various changes and modifications may be made without departing from the scope of the invention as defined in the following claims.

What is claimed is:

1. An apparatus for preventing a collision of vehicles at a crossroad in a network environment configured with a plurality of sensor nodes installed on roads connected to the crossroad, the apparatus comprising:

an information generating means installed at each road forming the crossroad for generating real-time vehicle information by integrating vehicles' information including a speed and a position provided from the vehicles on each of the roads to the plurality of sensor nodes on the roads and traffic sign information; and an information collecting and providing means for providing the traffic sign information to the information generating means, collecting vehicles' information in real-time from the information generating means of a predetermined road near the crossroad, storing the collected information, and providing the collected information to vehicles approaching the crossroad through another road of the crossroad such that the vehicles can predict a collision occurring in a danger area located within the crossroad.

2. The apparatus as recited in claim 1, further comprising:

an information providing means installed at a vehicle for providing vehicle information including a speed and a position of the vehicle running on roads including the sensor nodes to the sensor nodes connected through a network to the information generating means; and an information analyzing means installed at a vehicle for analyzing the real-time vehicle information including a speed, a position and a current traffic sign transmitted from the information collecting and providing means and predicting a collision of vehicles approaching the crossroad based on the result of analysis.

3. The apparatus as recited in claim 2, wherein the information providing means is a mobile sensor node installed at a vehicle approaching the crossroad where the plurality of sensor nodes forms a network, is capable of wireless communication with sensor nodes installed on the roads, analyzes information for predicting whether a traffic sign is "stop" or "go" by using the traffic sign information provided from the information collecting and providing means and the vehicle's information including the speed and the position when the corresponding vehicle arrives at the crossroad, and provides a warning message before approaching the crossroad when the predicted traffic sign is "stop".

4. The apparatus as recited in claim 2, wherein the information analyzing means is a mobile sensor node installed at a vehicle approaching the crossroad where the plurality of sensor nodes forms a network, determines whether vehicles will clash in the danger area of the crossroad by analyzing the collected information provided from the information collecting and providing unit, and provides a warning message before entering the danger area of the crossroad when the collision is predicted.

5. The apparatus as recited in claim 1, wherein the information generating means is a sensor network configured with the plurality of sensor nodes installed on roads near the crossroad, each of the sensor nodes has comparative position information based on the crossroad as a center in order to obtain accurate position information of vehicles, collects vehicle's information by sensing a speed and a position of vehicles passing through the sensing network, collects traffic sign information provided from the information collecting and providing means, and generating the real-time vehicle information having a message protocol format suitable for the sensor network.

6. The apparatus as recited in claim 5, wherein the information collecting and providing means is a base station installed near a center of the crossroad, generally installed with the traffic sign, collects information from roads near the crossroad from the information generating means, transmits the collected information to each of vehicles nearing the crossroad through a wireless link as a message protocol, and stores the real-time vehicle information collected from vehicles passing the roads near the crossroad in a manner of queue according to a time slot.

7. The apparatus as recited in claim 6, wherein the message protocol includes vehicle approaching direction information, traffic lane information, traffic sign information, speed information, and position information, the vehicle approaching direction information, the traffic lane information and the traffic sign information are expressed as bits to minimize a quantity of the message protocol, the position information is expressed as a comparative coordinate having a predetermined integer interval from an adjacent coordinate with a center of the crossroad as an origin (0,0) in order to reduce a quantity of a message protocol and to effectively perform an algorithm in the information analyzing means.

8. A method for preventing a collision of vehicles at a crossroad, wherein the method comprising the steps of:

installing sensor nodes on a plurality of roads forming a crossroad and building a network environment between the sensor nodes;

collecting traffic sign information of the crossroad in real time by the sensor node of a predetermined road, sensing a speed and a position of a vehicle on a corresponding road, and generating real-time vehicle information;

providing traffic sign information of the crossroad from the sensor node to the vehicle, and predicting a traffic sign when the vehicle arrives at the crossroad by the vehicle; and collecting a message protocol type of real-time vehicle information at a base station, and providing the collected information to vehicles approaching the crossroad through other roads to predict a collision in a danger area of the crossroad.

9. The method as recited in claim 8, further comprising the step of predicting a traffic sign when the vehicle arrives at the crossroad based on the speed and the position of the vehicle and the traffic sign information from the sensor node, and providing a warning message using the predicted traffic sign information.

10. The method as recited in claim 8, further comprising the steps of:

predicting whether the vehicle will clash with another vehicle approaching the crossroad through other roads within the danger area of the crossroad at each vehicle which receive the message protocol information; and providing a warning message of collision before entering the crossroad when the collision is predicted.

11. The method as recited in claim 8, wherein in the step of collecting the message protocol type, the collected message information is analyzed and transmitted to vehicles except vehicles located within a traffic lane in which the vehicle receiving the collected information is located using the vehicle approaching direction information in the message protocol.

12. The method as recited in claim 10, wherein in the step of predicting whether the vehicle will clash, if the vehicle is in a danger area with another vehicle approaching the crossroad through other roads when a possibility of collision is predicted using a current position, a time and a speed of the vehicle, and current positions, times and speed of another vehicle approaching the crossroad provided from the message protocol, it determines that the vehicle will clash with another vehicle, and the danger area is set as a rectangular shape region having a predetermined diameter in a center of the crossroad, if the diameter of the danger area is comparatively large, the possibility of the collision is set as low, and if the diameter of the danger area is comparatively small, the possibility of the collision is set as higher.

13. The method as recited in claim 10, wherein in the step of providing the warning message, it determines whether another vehicle is in the danger area beside the vehicle, if there is another vehicle in the danger area, a message is transferred to warn of a collision when the vehicle enters the crossroad, and if not, the message is not transmitted.

* * * * *